Nov. 24, 1953　　　A. H. LEWIS　　　2,660,061
IMMERSION TYPE THERMOCOUPLE TEMPERATURE
MEASURING DEVICE
Filed March 5, 1949　　　3 Sheets-Sheet 1

Inventor
A. H. Lewis
By Fetherstonhaugh &Co.
Attorneys

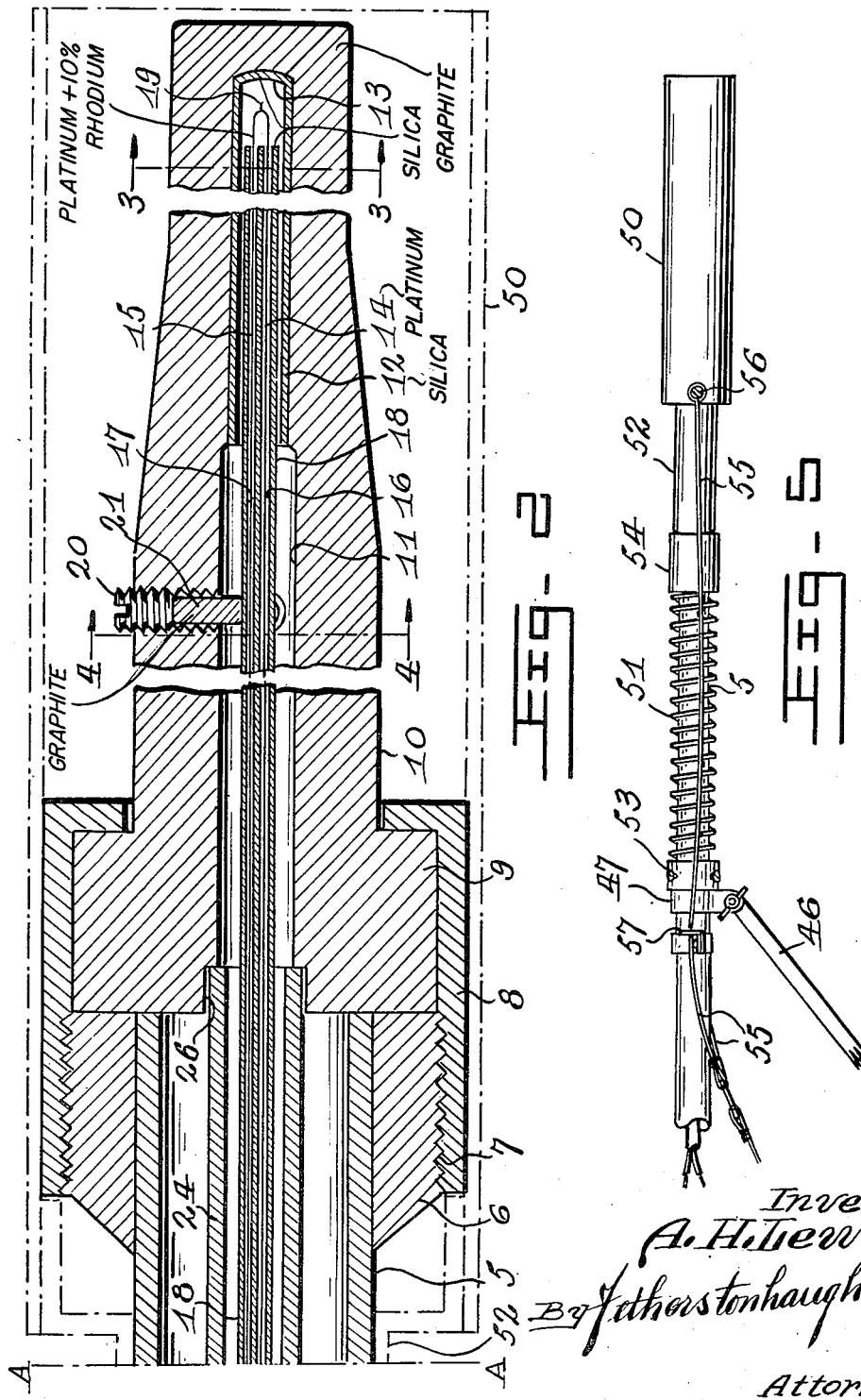

Nov. 24, 1953  A. H. LEWIS  2,660,061
IMMERSION TYPE THERMOCOUPLE TEMPERATURE
MEASURING DEVICE
Filed March 5, 1949 3 Sheets-Sheet 3

Inventor
A. H. Lewis
By Fetherstonhaugh & Co.
Attorneys

Patented Nov. 24, 1953

2,660,061

UNITED STATES PATENT OFFICE 2,660,061

IMMERSION TYPE THERMOCOUPLE TEMPERATURE MEASURING DEVICE

Alfred H. Lewis, Montreal, Quebec, Canada, assignor to Dominion Engineering Works Limited, Montreal, Quebec, Canada Application March 5, 1949, Serial No. 79,747

9 Claims. (Cl. 73—359)

This invention relates to devices for measuring high temperatures and more particularly to a portable immersion type of thermocouple for measuring the temperature of molten cast iron and molten bronze metals.

Pouring temperature of castings is an important variable in the casting process. If accurate pouring temperatures can be controlled or at least be recorded an important source of variable results would be eliminated leading to more consistent quality in the production of castings. In order to obtain accurate pouring temperatures, frequent readings are required and it is most desirable that the temperature measuring instrument be such that, when immersed in the metal, it will be quickly responsive to the temperature of the metal.

Heretofore several types of heat measuring immersion instruments have been employed without complete satisfaction. A common type is the silicon carbide tube which is immersed in the molten metal through a hole or other suitable opening in the wall or door of the furnace. The temperature readings are made on the inside of this tube by any suitable means. This type of measuring instrument is, of course, heavy and cumbersome making it unsuitable for portability for spot checking temperatures. Furthermore, when using it for checking temperatures in ladles, a fixed clamp on the edge of the ladle must be provided to secure the tube in place. This would make its use in the ordinary iron foundry impracticable since many ladles are used in the course of a day, all of which are filled to varying depths. Therefore each ladle would require an individual tube adjusted to suit the depth of the molten metal therein. As this type of tube is intended for continuous readings in fixed installations, it is not made to withstand sudden changes in temperatures but must be heated and cooled slowly making its use unsuitable for spot checking at high temperatures.

Another type of temperature measuring instrument commonly employed is the immersion thermocouple in which the thermocouple wires are placed in direct contact with the molten metal. This type is highly unsatisfactory in the employment of noble metal thermocouple wires when measuring temperatures of molten iron or molten bronze metals since the wires are rapidly contaminated thereby rendering them inaccurate, besides which these exposed wires will not stand up for any length of time when immersed in such metals at the relatively high temperatures obtained.

A particular object of the present invention is to provide an improved temperature measuring instrument which will permit temperatures of the molten metal to be obtained quickly and accurately.

Another object is to provide a relatively light, portable type of thermocouple which can be used for spot checking temperatures of molten metal with a minimum of delay.

A further object is to provide a noble metal thermocouple tip assembly with a protective graphite tip about the measuring tip ends of the wires which, when the thermocouple is immersed in molten metals at high temperatures, can withstand rapid fluctuations in temperature without damage to the tip assembly while at the same time permitting rapid and accurate temperature readings.

A further object is to provide an improved tip assembly designed to insulate the thermocouple wires and to protect them against damage or breakage while handling the apparatus.

A still further object is to provide a protective shield for the graphite tip of the tip assembly when the thermocouple is not in use.

Other objects and advantages of the present invention will be more readily understood from the following detailed description taken in connection with the accompanying drawings, in which:

Figure 2 is an enlarged broken sectional view of a part of the tip assembly shown in Figure 1.

Figure 3 is a sectional view along the lines 3—3 of Fig. 2a.

Figure 4 is a sectional view along the lines 4—4 of Figure 2a.

Figure 5 is an enlarged view of a portion of the tip assembly taken between the lines 5—5 of Figure 1 and showing a graphite tip protective shield in one position about the tip assembly.

Figure 3:
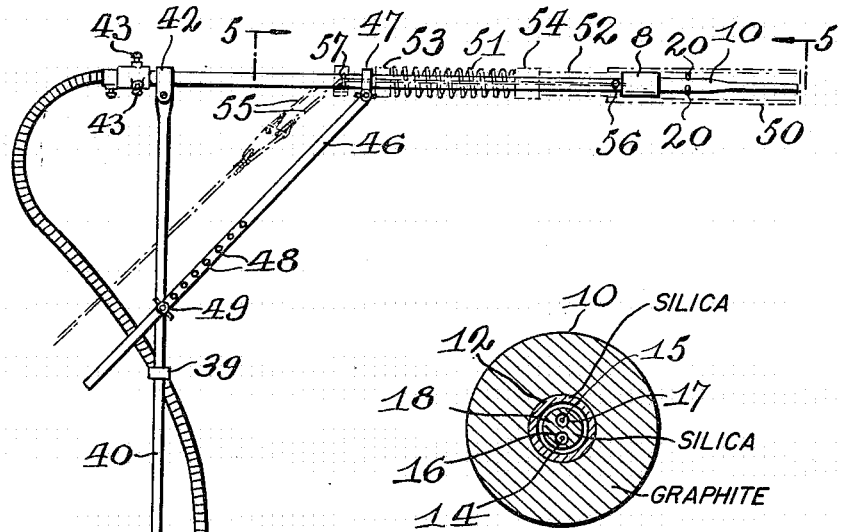
Figure 1:
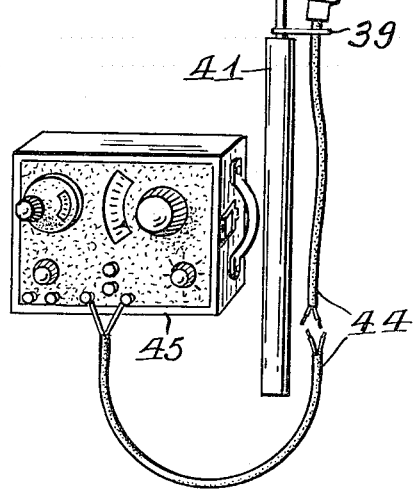
Figure 1 is a view showing the apparatus embodying my invention with the graphite tip protective shield arranged thereon in chain-dot line.
Figure 4:
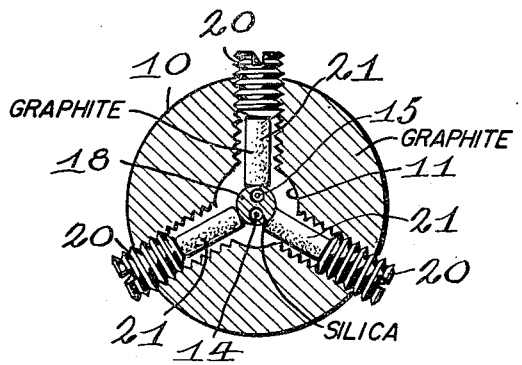

Referring more particularly to Figure 2 of the drawings, 5 designates a mild steel tubular casing over one end of which is welded a relatively short stainless steel collar 6. Collar 6 is threaded, as indicated at 7, to receive a stainless steel nut 8 which serves to clamp the flanged end 9 of a hollow tapering graphite immersion tip 10 to one end of steel casing 5. Graphite tip 10 is bored, as indicated at 11, from the flanged end to within a short distance of the tip end to receive a short, fused silica lining tube 12 which is closed at one end 13 and open at the opposite end. Tube 12 is snugly fitted in the bore of tip 10 with its closed end 13 butted against the tip end of the bore. Thermocouple wires 14 and 15 are contained within the holes 16 and 17 respectively formed in a long two-hole silica tubing 18. Wire 14 is preferably a standard gauge pure platinum wire and a wire 15 is a standard gauge platinum plus 10% rhodium wire. The wires 14 and 15 extend beyond one end of tubing 18 and are welded together, as indicated at 19, to form a measuring tip. The measuring tip end of tubing 18 extends into bore 11 and is inserted within silica lining tube 12 in spaced relation to the closed end 13 of tube 12 so that measuring tip 19 will be disposed a substantial distance from the closed end of tube 12. The silica tubing 18 is centered within graphite tip 10 by three set screws 20 which press three graphite plugs 21 against the silica tubing 18. This centering is intended to hold the silica tubing 18 in spaced relation to the side walls of silica lining tube 12 and also to prevent longitudinal movement of tubing 18 when the measuring tip 19 of wires 14 and 15 have been properly spaced from the end 13 of tube 12.

Figure 2A:
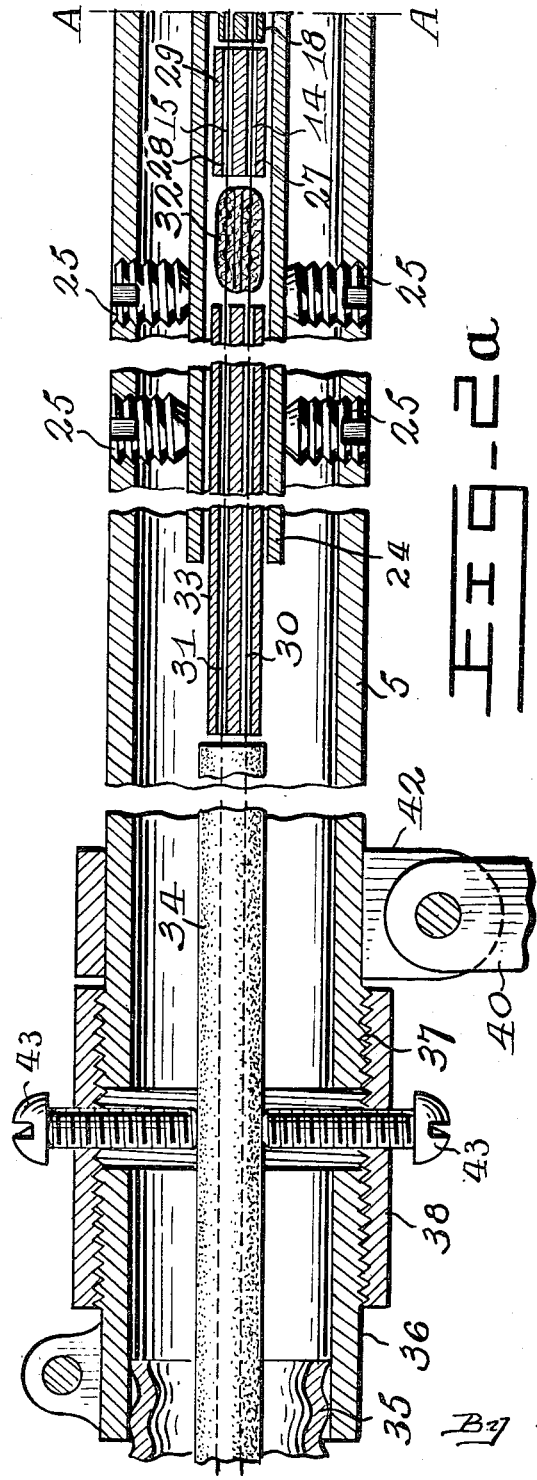
Figure 2a is a continuation of the view shown in Figure 2.

A copper tube 14 is arranged within tubular casing 5 and is held centrally therein by suitable set screws 25. One end of copper tube 24 projects beyond casing 5 and is fitted in a recess 26 provided in the flanged end of graphite tip 10. The recessing of the end of copper tube 24 in the flanged end of the graphite tip also serves to centre the copper tube. The thermocouple wires 14 and 15 and their enclosed silica tubing 18 project a substantial distance into the copper tube 24. As shown in Figure 2a, the ends of wires 14 and 15 remote from the measuring tip are threaded through holes 27 and 28 of a short length standard two-hole insulator 29 which is adjacent the silica tubing 18 in the copper tube 24. Wires 14 and 15 are silver soldered or otherwise coupled to compensating lead wires 30 and 31. The coupling of the wires is protected by asbestos, glass or other suitable insulating tape 32.

Lead wires 30 and 31 are insulated from copper tube 24 by a standard two-hole insulator 33 which extends beyond the end of tube 24 remote from the graphite tip. The compensating lead wires 30 and 31 which pass through tubular casing 5 beyond insulator 33 are encased in asbestos or other suitable covering material 34.

A flexible metal conduit 35 having an externally threaded nipple 36 at one end, is adapted to be connected to the externally threaded end 37 of casing 5 remote from the graphite tip 10 by an internally threaded coupling 38. The flexible conduit 35 is suitably clamped, as indicated at 39, to a rod 40 having a hand grip 41 at one end and the other end pivotally secured to casing 5 by suitable clamping means 42. Casing 5 and rod 40 are held at any desired angle by an adjusting bar 46 which is pivotally secured at one end to casing 5 by suitable clamping means 47. Bar 46 is provided with a plurality of spaced holes 48 for the selective reception of pin 49 carried by rod 40. Asbestos covered lead wires 30 and 31 are passed through coupling 38 and conduit 35 and are held against longitudinal shifting by machine screws 43 or other suitable means, which are threaded through openings in the coupling 38. An extension cord 44 beyond the end of conduit 35 connects the lead wires 30 and 31 to a measuring instrument 45 which is essentially a voltmeter.

When the tip assembly described herein is immersed in a molten metal, a voltage is created across the instrument terminals to which the thermocouple wires 14 and 15 are united by lead wires 30 and 31. This voltage, as indicated by instrument 45, is a function of the temperature of the molten metal being tested.

The graphite tip 10 employed in protecting the measuring tip, should be relatively light in weight for portability and easy manipulation of the thermocouple. This tip is substantially elongated and tapers from a point adjacent the collar towards the tip end, which tip end is cylindrical for a substantial distance from the end. The end and side walls of the cylindrical portion of graphite tip 10 are preferably about ¼ of an inch in thickness. This thickness has been found most satisfactory for heat penetration of the graphite to facilitate rapid temperature readings. End and side walls which are appreciably thinner than above specified, will enable equally rapid readings to be taken but are not satisfactory from a standpoint of durability because of rapid deterioration of the graphite.

The cylindrical portion of the graphite tip 10 which is lined within its bore 11 by silica lining tube 12 is designed to withstand rapid fluctuations in temperature, without appreciable deterioration or damage to the tip. Thus it renders the thermocouple particularly adaptable for spot checking temperatures of molten metal with a minimum of delay. The exposed measuring tip 19 of the noble metal wires 14 and 15 is subjected to the temperature of the molten metal which rapidly penetrates the walls of the graphite tip. This measuring tip is, however, confined within the space provided therefor adjacent the closed end 13 of silica lining tube 12. Thus tip 19 is completely protected from contact with the molten metal while being directly subjected to the heat from said metal.

The two-hole silica tubing 18 should be sufficiently long enough to encase the noble wires 14 and 15 from a point which is a substantial distance within the copper tube 24, through the bore 11 of graphite tip 10 and into the graphite tip silica lining tube 12 to within a short distance from the closed end 13 of said lining tube. Tubing 18, in addition to furnishing a protective insulation for wires 14 and 15, also serves as a means by which the tip 19 of these wires may be suitably spaced from the side walls of the silica lining tube 12. This is accomplished by the set screws and graphite plugs 20 and 21 which serve to centre the silica tubing 18 and to prevent it from resting on the tip 19. The copper tube 24 serves to prevent movement and consequent breakage of the various insulators 18, 29 and 22 as well as to provide further insulation means between the measuring wires and the steel tubular casing 5.

Figure 6:
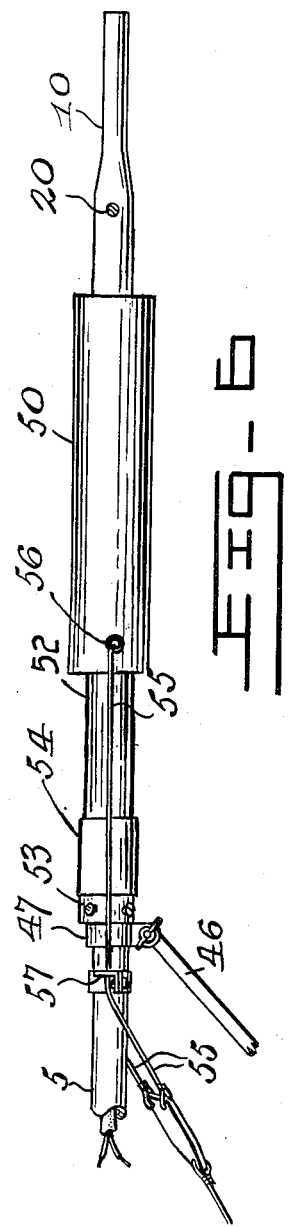
Figure 6 is a view similar to that shown in Figure 5 but with the shield in another position.

Another feature of this invention is in the provision of a tubular shield or protector 50 of stainless steel or other suitable heat resisting material. When the thermocouple is not in use protector 50 is spring projected by coil spring 51 to a position as shown in Figure 5 in which it covers the graphite tip 10 to prevent damage to the tip assembly by contact with other objects. When the thermocouple is to be used for taking a temperature reading, the tubular protector 50 is retracted to the position shown in Figure 6 so as to expose the graphite tip 10. The tubular protector 50 slides on thermocouple nut 8 and is carried by a tube 52 which slides on the tubular casing 5. Coil spring 51 is retained between a fixed collar 53 which is clamped about casing 5 and a collar 54 on the adjacent end of sliding tube 52. The protector 50 and its tube 52 are projected by coil spring 51 and retracted against the resistance of said spring by suitable restraining wires 55. Restraining wires 55 are linked at one end to protector 50, as indicated at 56, and are threaded through eyelets 57 carried by casing 5 to be connected at their other end to any suitable form of manually operable handle means (not shown).

It will be noted that coil spring 51 is completely covered by collar 54 when the shield is retracted so as to protect the spring from the heat.

Although I have shown and described a preferred embodiment of this invention, it will be understood that any suitable modifications and alterations may be resorted to without departing from the scope and spirit of my invention as defined by the appended claims.

The embodiments of this invention in which an exclusive property or privilege is claimed are defined as follows:

1. A portable thermocouple comprising a tubular casing, a graphite tip carried by one end of said tubular casing, said tip being bored from its inner end substantially throughout its length and closed at its outer end, a tube having conducting wires extending therethrough arranged in said casing to extend within the bore of said tip in spaced relation to the inner end and side walls of the bore of said tip, and means carried by said tip for centering said tube within the tip in spaced relation thereto, said means being radially disposed about said tube for adjustable engagement therewith.

2. A portable thermocouple as set forth in claim 1, in which said centering means include a plurality of graphite plugs radially arranged about said tube, and set screws threaded through the side walls in said tip and movable through the side walls to bear against the graphite plugs.

3. A portable thermocouple comprising a tubular casing, a graphite tip carried by one end of said tubular casing, said tip being bored from its inner end substantially throughout its length and closed at its outer end, a silica tube closed at one end and fitted in the bore of said tip to provide a lining therefor, a two-hole elongated silica tube arranged in said casing to extend within the lining of the graphite tip in spaced relation to the end and side walls of the lining, a pair of conductor wires extending through said last-mentioned tube in spaced relation to each other, said wires projecting beyond one end of the two-hole silica tube and being welded together to provide a measuring tip in the space provided between the two-hole silica tube and the end wall of said lining and being connected at their other ends to a suitable external measuring instrument, and means for centering the two-hole silica tube within the graphite tip comprising a plurality of graphite plugs radially arranged about said silica tube to prevent contact of said silica tube with the walls of said lining and set screws threaded through the side walls in said tip to bear against the graphite plugs in pressure engagement with said plugs.

4. A thermocouple graphite tip provided with a longitudinally extending bore open at one end and closed at the other end of the tip, and adjustable centering means carried by the tip and extending into the bore to engage and center a tube receivable in the bore.

5. A thermocouple graphite tip as set forth in claim 4, in which said centering means includes a plurality of bearing members radially arranged about the side walls of said tip for movement toward the axis of the bore.

6. A thermocouple graphite tip as set forth in claim 4, in which said centering means comprises a plurality of graphite plugs radially arranged about the side walls of said tip for sliding movement toward the axis of the bore and set screws threaded through the side walls of said tip to bear against the graphite plugs in pressure engagement therewith for actuating said sliding movement of said plugs.

7. A portable thermocouple comprising a graphite tip provided with a longitudinally extending bore open at one end and closed at the other end, casing of substantial diameter having one end butted against the wall of the open end of said tip, coupling means uniting said tip and said casing in end-to-end relation, rigid thermocouple wire guide means extending through said casing and into the bore of said graphite tip, a rigid protective tubing arranged within said casing to surround that portion of said guide means within the casing, and means for centering said protective tubing including a recess in the open end of said tip for holding one end of said tubing and a plurality of centering screws threaded through openings radially arranged at intervals about the casing for pressure engagement with said tubing.

8. A portable thermocouple comprising a tubular casing, a graphite tip carried by one end of said tubular casing, said tip being bored from its inner end substantially throughout its length and closed at its outer end, a silica tube closed at one end and fitted in the bore of said tip to provide a lining therefor, a two-hole silica tube arranged in said casing to extend within the lining of the graphite tip in spaced relation to the end and side walls of the lining, a pair of conductor wires extending through said last-mentioned tube in spaced relation to each other, said wires projecting beyond one end of the two-hole silica tube and being welded together to provide a measuring tip in the space provided between said two-hole tube and the end wall of said lining, means engaging said two-hole tube intermediate its length for centering said two-hole tube in spaced relationship with the side and end walls of said lining, a pair of lead wires connecting the free ends of said conductor wires with an external measuring instrument, insulators carrying the lead wires within the casing and that portion of the conductor wires adjacent to the connection between the lead and conductor wires, and a copper tubing arranged within said casing to protect said insulators and that portion of the two-hole silica tube extending into the casin, and means for centering said copper tubing within the casing, said means including a recess in the inner end of said graphite tip adapted to hold one end of the copper tube and a plurality of centering screws threaded through openings arranged at intervals about the casing and adapted to be butted against said copper tube.

9. A thermocouple graphite tip provided with a longitudinally extending bore open at one end and closed at the other end of the tip, a short silica tube closed at one end and open at the other end, said tube being tightly fitted in the bore of said graphite tip with its closed end butted against the closed end of said bore to provide a lining in direct heat conducting contact with the portion of the bore adjacent the tip end with the open end of said tube spaced inwardly a substantial distance from said open end of the tip and adjustable centering means carried by the side walls of said tip and extending into that portion of the bore not occupied by the lining tube to engage and center a thermocouple wire carrying tube receivable in the bore of said tip.

ALFRED H. LEWIS.

References Cited in the file of this patent

UNITED STATES PATENTS

| Number | Name | Date |
|---|---|---|
| 471,762 | Shoop | Mar. 29, 1892 |
| 1,259,372 | Davey | Mar. 12, 1918 |
| 1,444,133 | Norwood | Feb. 6, 1923 |
| 1,675,210 | Campbell et al. | June 26, 1928 |
| 2,019,695 | Ross | Nov. 5, 1935 |
| 2,266,416 | Duclos | Dec. 16, 1941 |
| 2,303,704 | Oseland | Dec. 1, 1942 |
| 2,425,557 | Obermaier | Aug. 12, 1947 |

FOREIGN PATENTS

| Number | Country | Date |
|---|---|---|
| 560,829 | Germany | Oct. 7, 1932 |

OTHER REFERENCES

Griffiths: Methods of measuring temperature (1918), page 71.

R. Royds: The Measurement of Steady and Fluctuating Temperatures, page 56 (1921), Constable and Company, Ltd., London, England.

Brown: Prometer Catalog (1924), page 25.